(12) United States Patent
Moulds et al.

(10) Patent No.: US 6,277,227 B1
(45) Date of Patent: *Aug. 21, 2001

(54) METHOD OF SEALING A PACKAGE

(75) Inventors: Kristopher A. Moulds, Fort Gratiot;
Donald F. Notaro, Shelby Township;
Michael Jones, Howell, all of MI (US)

(73) Assignee: JM Industries, Inc., Warren, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/488,197

(22) Filed: Jan. 19, 2000

Related U.S. Application Data

(63) Continuation of application No. 09/164,953, filed on Oct. 1, 1998, now Pat. No. 6,117,262, which is a continuation of application No. 08/542,820, filed on Oct. 13, 1995.

(51) Int. Cl.[7] .............................. B32B 31/00; B65B 51/06

(52) U.S. Cl. .................... 156/212; 156/247; 156/289; 53/419

(58) Field of Search .................................. 156/247, 249; 53/412, 416, 419, 492, 133.7, 137.2, 393; 428/343

(56) References Cited

U.S. PATENT DOCUMENTS

| 3,873,018 | * | 3/1975 | Donnay . |
| 4,869,769 | * | 9/1989 | DiRusso, Jr. et al. . |
| 5,153,043 | * | 10/1992 | Wang . |
| 5,340,629 | * | 8/1994 | Rodighiero . |
| 5,525,390 | * | 6/1996 | Yang . |
| 5,980,676 | * | 11/1999 | Meetze . |

FOREIGN PATENT DOCUMENTS

| 1 422 364 | * | 1/1997 | (GB) . |
| 63-57687 | * | 3/1988 | (JP) . |
| 96/05108 | * | 2/1996 | (WO) . |

* cited by examiner

Primary Examiner—Curtis Mayes
(74) Attorney, Agent, or Firm—Brooks & Kushman P.C.

(57) ABSTRACT

A packaging tape includes a plastic film formed in a continuous length, and having first and second edges along the continuous length, and further having first and second portions continuously along the length adjacent the first and second edges, respectively. An adhesive is applied to both the first and second portions. Means for deadening the adhesive is applied to the first portion, whereby the first portion forms a continuous pull-tab along the length of the tape to facilitate removal of the tape. Ink is applied to the first portion for displaying tape removal instructions. A method of manufacturing the tape is also provided.

3 Claims, 2 Drawing Sheets

METHOD OF SEALING A PACKAGE

CROSS REFERENCE TO RELATED APPLICATIONS

This application is a continuation of U.S. application Ser. No. 09/164,953, filed Oct. 1, 1997, now issued as U.S. Pat. No. 6,117,262, which is a continuation of U.S. Ser. No. 08/542,820, filed Oct. 13, 1995.

TECHNICAL FIELD

The present invention relates to packaging tape, and more particularly to packaging tape with an integral pull-tab.

BACKGROUND OF THE INVENTION

Adhesive packaging tape is typically used in packaging of boxes and cartons, and also in various manufacturing processes for securing or adhering components. The problem with this tape arises when attempting to re-open the closed package. When removing the tape from the package, it is often difficult to grip the tape for removal. Often, an operator must cut the tape with a knife or dig up a corner of the tape, each of which likely results in damage to the underlying package or carton.

It is desirable to provide a packaging tape designed in a manner in which it is easy to remove without loss of adherence characteristics and without damage to the underlying package.

DISCLOSURE OF INVENTION

The present invention overcomes the above referenced shortcomings of prior art packaging tape designs by providing packaging tape with a pull-tab formed continuously along the length of the tape to facilitate removal of the tape from a package. Ink is applied to the non-adhering portion for displaying tape removal instructions, and a coating is applied over the ink as a means for deadening the adhesive applied to the non-adhering portion.

More specifically, the present invention provides a packaging tape comprising a plastic film formed in a continuous length, and having first and second edges along the continuous length, and further having a first portion and a second portion continuously along the length adjacent the first and second edges, respectively. An adhesive is applied to both the first and second portions. Means for deadening the adhesive is applied to the first portion, whereby the first portion forms a continuous pull-tab along the length of the tape.

The present invention also provides a method of manufacturing packaging tape comprising the steps of: (i) providing a plastic film having a film width and formed in a continuous length with an adhesive on one side thereof, and having an edge continuously along the length; (ii) deadening a portion of the adhesive along said edge, whereby to form a non-adhering portion acting as a pull-tab continuously along the length of the tape to facilitate removal of the tape.

Accordingly, an object of the present invention is to provide a packaging tape which is easily removed from a package without the need for cutting the tape and with minimal risk of damaging the underlying package.

Another object of the present invention is to provide an improved packaging tape with a continuous pull-tab formed along the length of the tape to facilitate removal of the tape from the package.

The above objects, and other objects, features and advantages of the present invention are readily apparent from the following detailed description taken in connection with the accompanying figures.

BEST MODE FOR CARRYING OUT THE INVENTION

Figure 1:
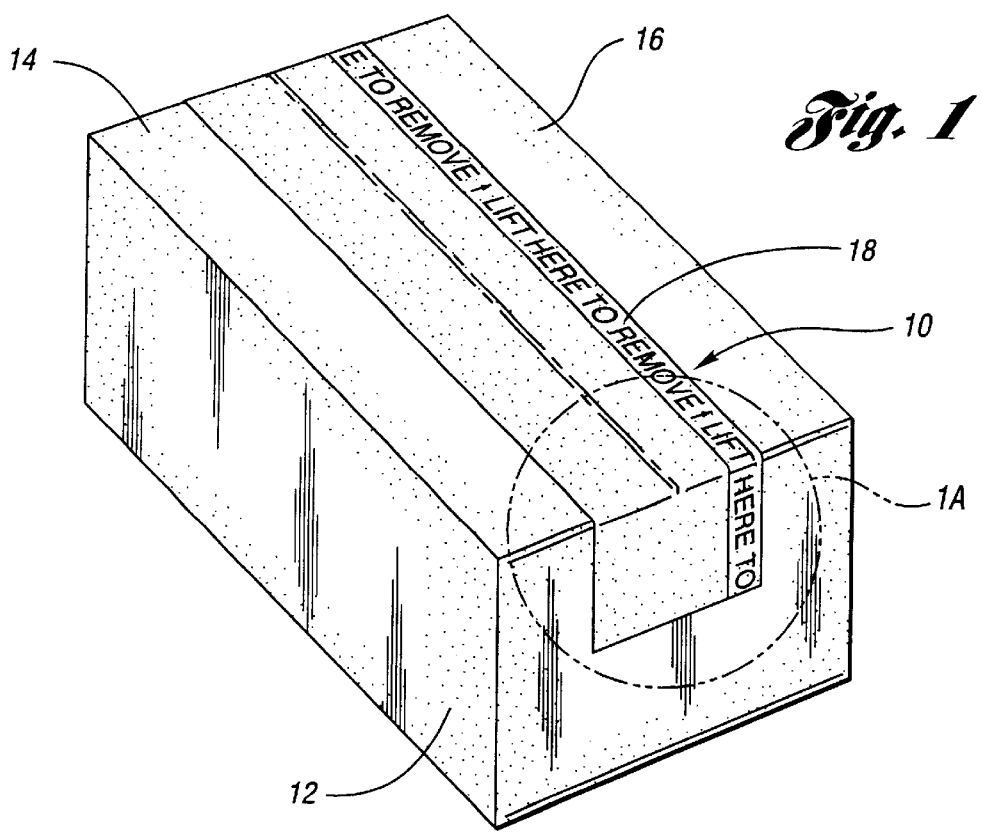
FIG. 1 shows a perspective view of packaging tape secured to a package in accordance with the present invention.
Figure 1A:
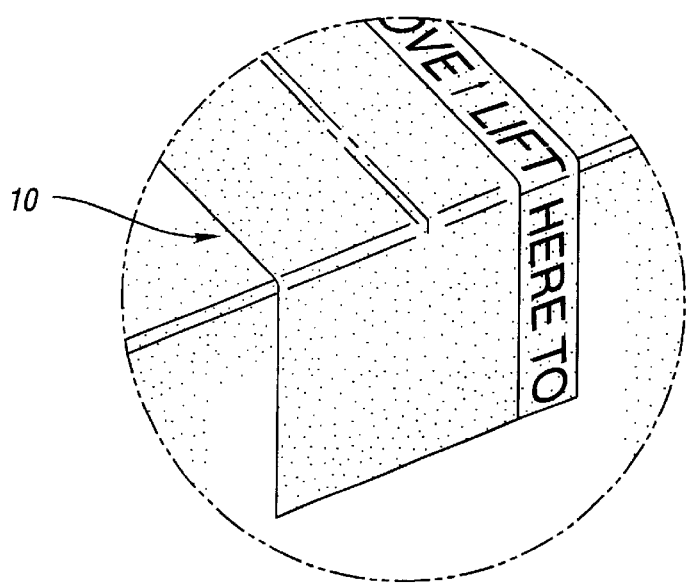
FIG. 1a shows an enlarged view of the packaging tape and package of FIG. 1, taken in the area 1A.

FIGS. 1 and 1a show a packaging tape 10 for use in taping a package 12 in accordance with the present invention. Opposing flaps 14, 16 of the package 12 are collapsed, and the packaging tape 10 is placed over the top of the two flaps 14, 16 for securing the flaps in a closed position, as shown in FIGS. 1 and 1a. In order to facilitate removal of the packaging tape 10 from the package 12 without damaging the underlying package 12, a pull-tab 18 is provided continuously along the length of the tape 10 to facilitate removal of the tape.

Figure 2:
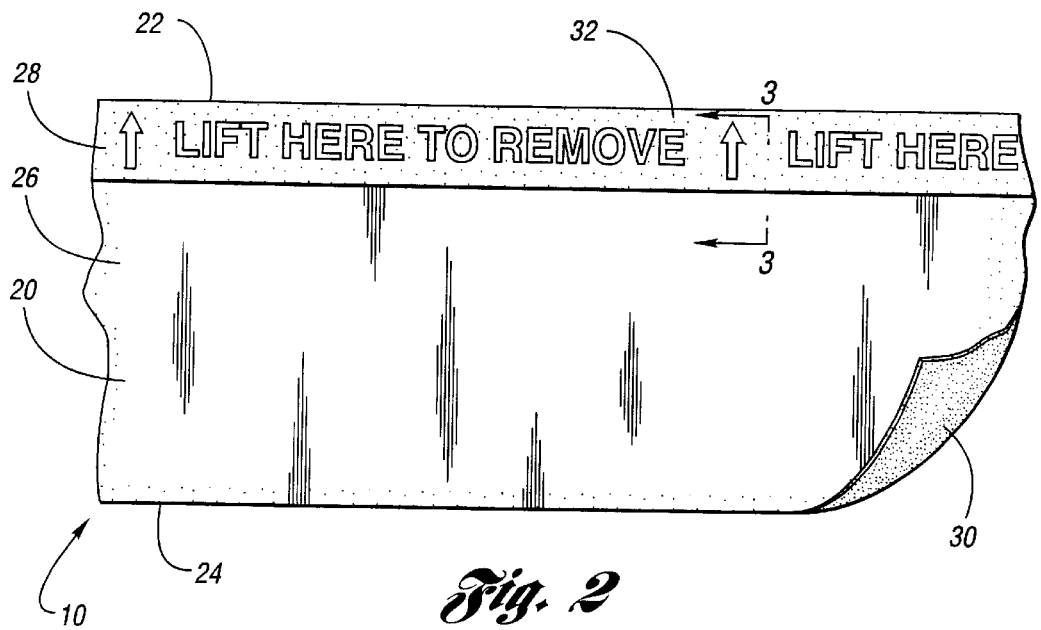
FIG. 2 shows a partially cut away plan view of packaging tape in accordance with the present invention.
Figure 3:
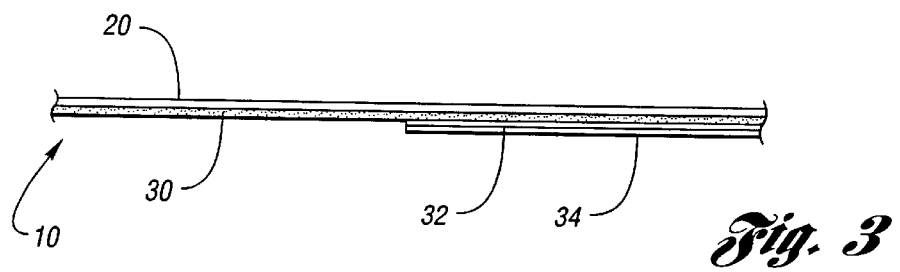
FIG. 3 shows a partially cut away sectional view of the packaging tape taken at line 3—3 in FIG. 2.

As shown in the plan view of FIG. 2 and sectional view of FIG. 3, the packaging tape 10 comprises a plastic film 20 formed in a continuous length, and having first and second edges 22, 24 along the continuous length. The plastic film 20 includes an adhering portion 26 (also referred to as a second portion) for attachment to a package and a non-adhering portion 28 (also referred to as a first portion) which is coated so that it does not stick to the package. The non-adhering portion is formed continuously along the length adjacent the edge 22, and the adhering portion is formed continuously along the length adjacent the opposing edge 24, the non-adhering portion 28 extending less than half-way across the film width. The plastic film is preferably a polypropylene or a polyester film with a thickness of 1.6 mil to 3.2 mil.

An adhesive 30 is applied to one side of the film 20—covering both the adhering portion 26 and the non-adhering portion 28 of the film 20. The adhesive 30 is preferably a pressure-sensitive adhesive, such as an acrylic-based adhesive, a "hot melt" adhesive or a natural rubber adhesive. Ink 32 is then applied over the adhesive 30 on the non-adhering portion 28 of the film 20. The ink 32 may be any desired color and preferably displays tape removal instructions, such as "LIFT HERE TO REMOVE". The ink may be a water-based ink or solvent-based ink.

A means for deadening the adhesive 30 is then applied over the ink 32 on the non-adhering portion 28 of the film 20. The means for deadening the adhesive 30 preferably comprises a solvent-based coating 34 applied over the ink 32 and adhesive 30 on the non-adhesive portion 28. The solvent-based coating 34 acts as an "deadener" by covering the adhesive 30 with a 1.0 mil layer which de-activates the adhesive. In this manner, the coating 34 causes the non-adhering portion 28 not to adhere to the package 12, thereby forming a continuous loose pull-tab along the length of the tape 10 to facilitate removal of the tape.

Alternatively, the ink 32 itself could act as the means for deadening the adhesive, thus eliminating the need for the coating 34.

Figure 4:
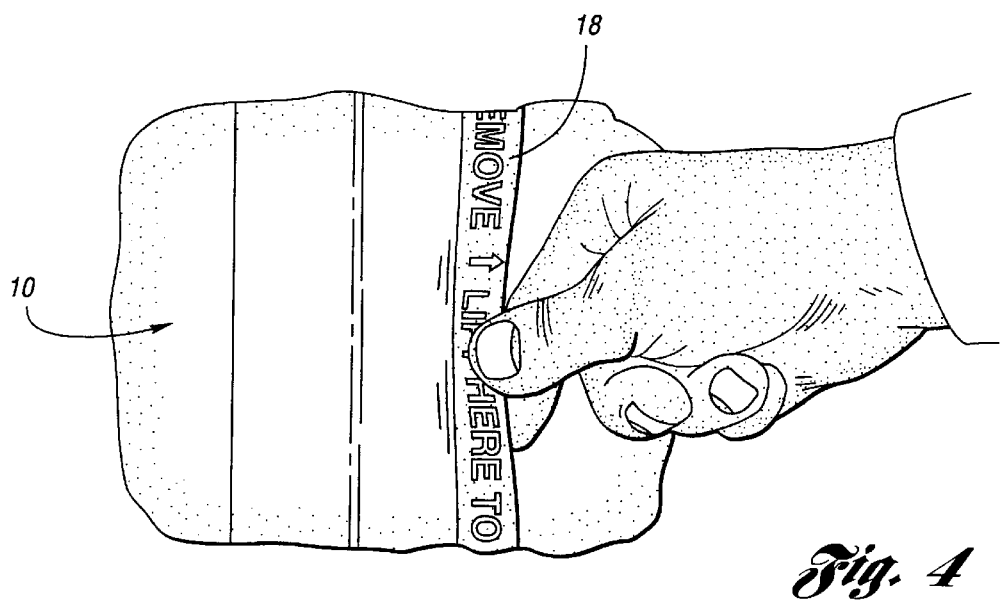
FIG. 4 shows a cut away plan view of packaging tape being removed from a package by a user in accordance with the present invention.

FIG. 4 shows the ease with which a user may remove the packaging tape 10 from a package by simply lifting the pull-tab 18, and removing the tape 10.

In manufacturing the tape, the plastic film 20 is covered on one side with adhesive 30 and forms a continuous length. Ink 32 is then applied across less than one-half of the film width of the plastic film 20 along the edge 22 over that portion of the adhesive 30 for displaying tape removal instructions. The solvent coating 34 is then applied over the ink 32, whereby to form a non-adhering portion acting as a pull-tab 18 continuously along the length of the tape 10 to facilitate removal of the tape.

While the best mode for carrying out the invention has been described in detail, those familiar with the art to which this invention relates will recognize various alternative designs and embodiments for practicing the invention as defined by the following claims:

What is claimed is:

1. A method of securely sealing and easily unsealing a package, comprising:

wrapping a packaging tape around the package to seal the package, said packaging tape being formed in a continuous length having opposing sides, with one side having opposing continuous edges along the continuous length of the packaging tape with an exposed adhesive along one continuous edge sealing the package and a non-adhesive surface exposed along the other continuous edge and extending the continuous length of the packaging tape and having a width sufficient to provide a continuous pull-tab enabling grasping and stripping of the tape from the package; and exposing said non-adhesive surface sufficiently during said wrapping to facilitate unsealing the package by grasping the pull-tab and stripping the packaging tape from the package.

2. A method of securely sealing and easily unsealing a package, comprising:

wrapping a packaging tape around the package to seal the package, said packaging tape being formed in a continuous length having opposing sides, with one side having opposing continuous edges along the continuous length of the packaging tape with a non-adhesive surface along one continuous edge and extending the continuous length of the packaging tape and having a width sufficient to provide a continuous pull-tab enabling grasping and stripping of the tape from the package, and said one side having an adhesive along the continuous length of the tape adhering the tape to the package during said wrapping for securely sealing the package; and exposing said non-adhesive surface sufficiently during said wrapping to facilitate unsealing the package by grasping the pull-tab and stripping the packaging tape from the package.

3. The method of claim 2, further comprising displaying the tape removal instructions on the tape.

* * * * *